Aug. 5, 1952   R. L. HEIDER   2,606,207
PURIFICATION OF DIMETHYL ACETAMIDE
Filed Dec. 30, 1949
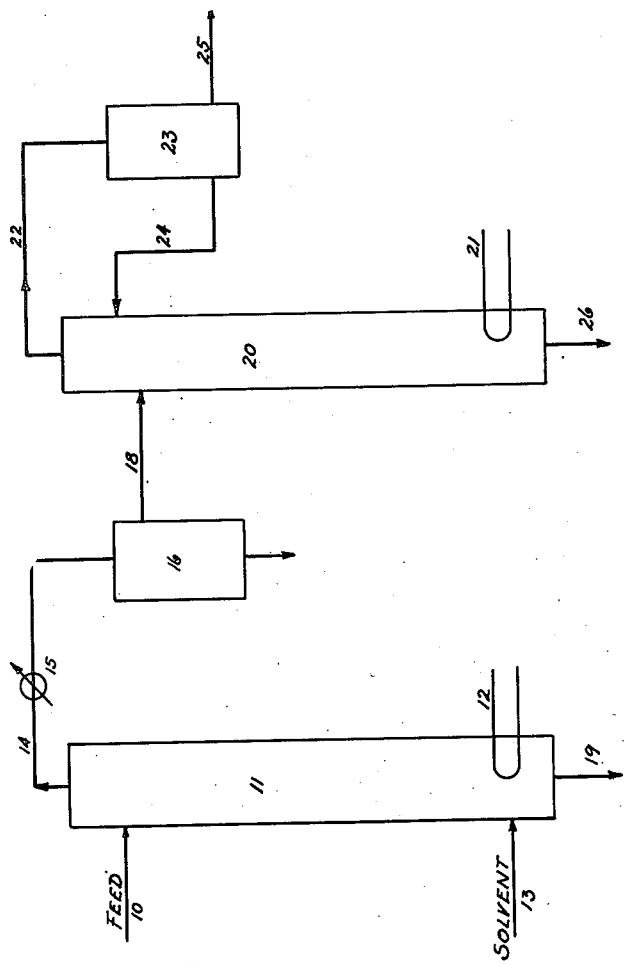
INVENTOR.
RUDOLPH L. HEIDER.
BY Herman O. Bauermeister
his attorney Patented Aug. 5, 1952

2,606,207

UNITED STATES PATENT OFFICE 2,606,207

PURIFICATION OF DIMETHYL ACETAMIDE

Rudolph L. Heider, Dayton, Ohio, assignor to Monsanto Chemical Company, St. Louis, Mo., a corporation of Delaware Application December 30, 1949, Serial No. 136,018

1 Claim. (Cl. 260—561)

The present invention relates to a purification process for alkyl-substituted acylamides.

It is an object of the invention to purify and isolate alkyl-substituted acylamides, such as dimethyl acetamide. It is also an object of the invention to utilize particular solvents which have been found to possess peculiarly effective chemical affinity for such acylamides in the purification thereof from technical mixtures.

It is also an object of the invention to provide a continuous process whereby fouled solutions of acylamides resulting from industrial processes may be purified for reuse. Another object of the invention is to provide anhydrous substituted acylamides by a method superior to the processes of the prior art.

The production of substituted acylamides, as well as the recovery of such compounds from various industrial processes is commonly attended by the presence of water. It has been found to be difficult to remove the water from the acylamide, particularly when it is desired to obtain the acylamides in anhydrous form. While it is possible to make the separation of water from the amide by means of distillation there are several disadvantages resulting from the use of a distillation process.

The removal of water from aqueous solutions of alkyl-substituted acylamides requires the use of large amounts of heat, since the water must be evaporated from the solution by vaporization to leave a residue of the desired acylamide. Such a method is cumbersome, slow and is quite expensive because of the heat necessary to vaporize all of the water. Such distillation processes also require large expenditures for equipment since the dilute solutions which are encountered require that large stills be employed together with the necessary condensers, tankage and auxiliary equipment.

It has now been found that alkyl-substituted acylamides in aqueous solution may be separated from the water by means of a contacting process in which particular solvents are employed.

The foregoing and other objects of the invention are accomplished in the present process in which the alkyl-substituted acylamides, obtainable as a solution in water or other solvents, are contacted with an organic hydrogen-bonding donor compound. The hydrogen-bonding donor compound has a limited solubility in water, and functions to extract the substituted amide, so that the complex formed thereby is separated from the excess water.

Hydrogen-bonding is a concept advanced in recent years to explain certain abnormalities in the chemical and physical behavior of mixtures of compounds, one of which contains hydrogen attached to a stronger negative radical and the other an atom capable of donating a pair of electrons to form a directional or coordination bond. Since the bond is formed by the donation of an electron pair from one atom, the donor, to the other atom the bond is not of the type conceived of as an ordinary valence bond, but many of the properties of the mixture indicate that a type of chemical compound is formed. These mixtures, for instance, exhibit an abnormal vapor phase lowering, that is, a negative deviation from Raoult's law. There is further observed abnormal heats of mixing and abnormal deviation in viscosity and freezing point lowering. I have found that when an alkyl-substituted acylamide is mixed with an organic hydrogen-bonding donor compound it exhibits characteristics unexplainable upon the basis of ordinary chemical reaction and unexpected from a consideration of the characteristics of the materials mixed. Apparently the substituted amide has an acceptor hydrogen atom and forms some type of compound with a hydrogen-bonding donor.

It will be understood that in advancing the theory of hydrogen-bonding to explain the unexpected results of the present invention I do not intend to be limited or restricted by this theory. The theory may or may not be correct and for the purposes of the present invention it is of importance largely because, whatever the reason, the type of compounds known to be organic hydrogen-bonding donors exhibit a selective effect which is useful in separating the substituted acylamides from water and other solvents, and in achieving substantially anhydrous solutions of the desired amides.

In general, compounds falling into five classes may serve as the organic hydrogen-bonding donor compounds of this invention, and so far as I have been able to find, any substances in these classes may be used, provided that they are within the volatility limits hereinafter specified. The classes are:

1. Halogens and compounds containing halogens attached to hydrocarbon compounds having from 1 to 3 carbon atoms, and in which at least one such aliphatic carbon atom has attached to itself from 1 to 3 halogen atoms and at least one hydrogen atom;

2. Oxygenated compounds boiling at temperatures less than 10° and preferably less than 20° below the boiling point of the particular alkyl-substituted acylamide which it is desired to purify. Specific types of donor compounds within the field of oxygenated compounds are the organic acids such as 2-ethyl hexanoic acid, ketones such as 1-decanone, and aldehydes such as 1-decaldehyde and alcohols such as nonyl alcohol;

3. Nitrogen compounds such as higher amines boiling at less than 10° and preferably less than 20° below the boiling point of the particular alkyl-substituted acylamide which it is desired to purify, a typical compound of this type is lauryl amine or the technical amine mixtures which are obtainable from the amination of naturally occurring and synthesized fats and fatty acids;

4. Compounds containing sulfur, such as mercaptans boiling at less than 10° and preferably less than 20° below the boiling point of the particular alkyl-substituted acylamide which it is desired to purify;

5. Compounds containing phosphorus which boil at less than 10° and preferably less than 20° below the boiling point of the particular alkyl-substituted acylamide which it is desired to purify.

The substances of class No. 2 are the subject of this application, and the substances of classes 1, 3, 4 and 5 are the subject of copending application Serial No. 101,203, filed June 24, 1949, now U. S. Patent 2,602,817, of which the present case is a continuation-in-part.

In addition to the use of single compounds characterized by furnishing hydrogen-bonding donor groups, mixtures of such compounds may also be employed in the process of the present invention.

The purification process of the present invention is applicable to various N,N'-dialkylacylamide having from 1 to 2 carbon atoms in each alkyl-substituent, which substituents may be the same or dissimilar radicals in the same molecule. The aliphatic hydrocarbon radical present in the acyl group may have from 1 to 3 carbon atoms. A representative group of such 1 to 3 carbon atom acylamides to which the present invention is applicable, are the amides prepared as the aliphatic dimethylamides described by Ruhoff and Reid in the Journal of the American Chemical Society, 59, 401 (1937).

I have found that the difficulty attending the purification and isolation of alkyl-substituted acylamide may be overcome by contacting the crude mixtures of such compounds with particular chemical solvents having active hydrogen compounds, so that my solvent extraction process enables such alkyl-substituted acylamides to be removed as a separate liquid phase by virtue of the peculiar chemical bonding occurring between such alkyl-substituted acylamides and the designated chemical solvents having active hydrogen radicals.

The compounds contemplated in the present invention as providing the source of active hydrogen bonds are the group of oxygen-containing organic compounds characterized by the presence of an oxygen group bound to a carbon atom. Thus, the classes of compounds which have been found to be particularly useful are the organic acids, the aldehydes and alcohols. Such hydrogen-bonding solvents are preferably selected from the group having boiling points in the range of 150°-200° C. Compounds meeting the above criteria are of general utility in the purification process of the present invention. It is also desirable, although not essential, that such hydrogen-bonding solvents possess the further characteristic that their solubility in water as measured at 25° C. shall be less than 1%.

The present process of purification or separation of the alkyl-substituted acylamides may be carried out by mixing such compounds in the form of technical mixtures of fouled or spent solutions with the chemical compound having active hydrogen radicals. Agitation may also be employed to improve the rate of mixing, or other contacting means such as packed towers may be utilized. After the solutions have been contacted, a separation step, such as gravity separation or centrifuging may be employed to remove the rich solvent containing the alkyl-substituted acylamide from the original mixture or starting solution.

As an illustration of an embodiment of the present invention the examples below illustrate typical procedures which may be employed in carrying out the invention.

*Example 1*

Dimethylacetamide was obtained as a 50 weight percent aqueous solution. 200 parts by weight of this crude material was contacted with an equal amount of 2-ethyl hexanoic acid in a batch extraction system employing a single contact with the extractant. The recovery of the dimethylacetamide amounted to 48% by weight of the starting material.

Further contacting with fresh solvent was found to increase the recovery. Measurements of various physical properties show that hydrogen bonding occurs between the alkyl-substituted acylamide compound and the extractants such as the 2-ethyl hexanoic acid so that a selective solvent fractionation occurs.

*Example 2*

A crude solution of N,N-diethylformamide as a 50% concentrate with water was contacted with n-octyl alcohol. This hydrogen-bonding extractant was employed to the extent of 50% by volume relative to the aqueous solution of the amide. After the extracting solvent had been mixed with the crude amide, the mixture was allowed to settle, and the extract layer separated. It was found that 68% of the N,N-diethylformamide was recoverable in the solvent as a result of the extraction process.

*Example 3*

A contacting system was arranged for multiple contacting, and employing the same materials as in the preceding example. Two successive contacts were found to result in the extraction of 96% of the N,N-diethylformamide originally present.

*Example 4*

Dimethylacetamide was used as a dilute aqueous solution to be extracted with n-octyl alcohol. Contacting with about half the proportion of solvent was found to give an extract which, upon separation of the amide, amounted to 28% of the original dimethylacetamide.

*Example 5*

A 50% solution of N-methylformamide in water was contacted with n-octyl alcohol. A single stage extraction resulted in the removal of 32% of the amide originally present. It was found that the process was applicable on amide solutions of various concentrations, and with the solvent ratio varying over wide ranges.

Example 6

N-methylformamide as a solution containing an equal amount of water was extracted with n-octyl alcohol. After contacting, and separation of the phases, the recovery of the amide amounted to 20% in a single contact.

Example 7

N-methylformamide was also extracted from an aqueous solution with an equal volume of n-octyl alcohol. The amide present in the organic solvent amounted to 32% of the amide originally present.

Example 8

N,N-diethylformamide was extracted from an aqueous solution using an equivalent volume of 2-ethyl-hexanoic acid. The solvent was removed from the water layer and found to contain 80% of the amide originally present.

Example 9 n-Octyl alcohol was contacted with an equal amount of a 50% solution of N,N-diethylformamide. The extract, after a distillation separation, gave a recovery of 68% of the amide.

Example 10

A solution of dimethylformamide in water was provided for an extraction test. The purification process was operated in a countercurrent extraction tower employing 2-ethyl butyric acid. Ten parts by weight of a 50% aqueous solution of the amide gave a final product of 7.6 parts after distillation of the substantially pure dimethylformamide as the result of continuous countercurrent extraction with 20 parts by weight of the hydrogen bonding solvent.

I have also found it to be possible to carry out the process of the invention with impure and technical grades of the extractive compounds, such as are ordinarily available at 90% to 95% purity. Mixtures of these hydrogen-bonding extractive solvents may also be employed, such as the technical mixtures which are ordinarily obtainable without extensive purification of such solvents.

Example 11

The extraction of N-monomethylacetamide, $CH_3CONHCH_3$, was demonstrated by taking 25 volumes of this compound together with 25 volumes of water as a homogeneous solution. The contacting solution was 25 volumes of n-decyl alcohol, which was added as a single batch contact. The extraction layer which separated after mixing showed a considerable recovery in a single contact of the initial N-monomethylacetamide.

Example 12

The extraction of diethylformamide from a solution with an equal volume of water was tested by the use of n-heptaldehyde employed to the extent of 50% by volume of original aqueous solution. After a single contact and agitation, the lower organic layer was separated to give a substantial recovery of the original diethylformamide.

Example 13

Dimethylacetamide as a 50% by volume of solution with water was extracted with 50% of n-decyl alcohol. A single contact resulted in the extraction of 16% of the original dimethylacetamide.

Example 14

The use of an aldehyde as the hydrogen-bonding extraction medium was shown with the dimethylacetamide solution. A 50% solution of the amide in water was contacted with 50% by volume of n-heptaldehyde. After settling of the aqueous and organic layers it was found that an appreciable proportion of amide present in the starting material had been extracted.

Example 15

A 50% solution of dimethylacetamide in water was extracted with 50% by volume of nonyl alcohol. After agitation of the mixture and separation of the organic layer, the extracted amide amounted to 16% by volume.

Example 16

The efficiency of aldehydes as extraction media was illustrated by the use of octaldehyde (2-ethyl hexaldehyde) which was employed to the extent of 50% by volume with a solution of equal parts of dimethylacetamide and water. The separated organic layer showed a recovery of 20% by volume of the original dimethylacetamide.

Repetition of the above experiment with n-hexaldehyde showed the recovery of a small proportion of the originally present amide.

In the accompanying drawing, there is portrayed diagrammatically, equipment which may be used in carrying out the present invention. The crude amide is fed via line 10 into extractor 11 which may be equipped with heating means 12. The hydrogen-bonding donor solvent is fed into the bottom of the extractor column via line 13. Such a method is employed because the solvents in general are characterized by a lower specific gravity than is the alkyl-substituted acylamide which it is desired to purify. For those instances in which the hydrogen-bonding donor solvent is heavier than the amide the countercurrent extraction may be operated with a bottom feed of the amide and a top feed of the solvent, as is shown more particularly in my copending patent application described above.

As a result of the extraction operation, the overhead product is obtained and withdrawn from the column via line 14, and cooled in cooler 15. Such product may be stored in separator 16 in which a separation may be effected to remove water from the rich solvent. A raffinate stream consisting mainly of water may be withdrawn from column 11 by line 19.

The rich solvent containing the alkyl-substituted acylamide is withdrawn from the top of separator 16 via line 18 and then passes into stripper 20. The stripper may also be provided with heating means 21 which may also function as a sparger for the introduction of inert gases if desired. An overhead product is withdrawn via line 22 from stripper 20 and is then passed through cooler 21 into accumulator 23. A portion of the overhead product may be returned as reflux to the stripper by means of line 24 and the purified alkyl-substituted acylamide may be withdrawn via line 25. The stripper operates on a binary system of solvent and the amide, and may take an overhead stream of the solvent in case the solvent boils lower than the amide. However, when the solvent boils higher than the amide, the latter is taken overhead. The higher boiling constituent is withdrawn from stripper 20 via line 26. The solvent is then returned to the extractor in a continuous process.

The alkyl-substituted acylamides which are to be purified may be utilized in various technical mixtures. Thus, the process of the present invention may be applied to aqueous or no-aqueous solutions, which may also contain the various raw materials such as acids and amines, from which the amides are prepared. Spent solutions diluted with various compounds resulting from the use of alkyl-substituted acylamides as industrial solvents may also be purified to recover such amides by the process of the present invention.

The operating conditions in carrying out the present invention are not critical. The extraction may also be effected at atmospheric or elevated pressures and temperatures. The proportions of the extracting solvent are not critical, and may be varied widely, for example, from 10% to 500% of the original solution of the amide to be purified, although ratios above and below this range are likewise operative, but require more extensive processing.

Having now described certain specific forms of the invention, it is to be understood that the invention is not to be limited to the specific compounds and methods hereindescribed, or specifically covered by the claim.

What is claimed and is desired to be protected by Letters Patent of the United States is:

In a process for producing substantially pure dimethylacetamide from an aqueous solution thereof, the steps of contacting said solution with 2-ethyl hexanoic acid, removing the extract of the said acid and dissolved dimethylacetamide, and stripping the said extract to recover the said dimethylacetamide.

RUDOLPH L. HEIDER.

REFERENCES CITED

The following references are of record in the file of this patent:

UNITED STATES PATENTS

| Number | Name | Date |
|---|---|---|
| 2,401,234 | Farlow | May 28, 1946 |

FOREIGN PATENTS

| Number | Country | Date |
|---|---|---|
| 403,508 | Germany | Sept. 26, 1924 |

OTHER REFERENCES

Lachmann: "Am. Chem. J.," vol. 18 (1896), p. 607.

Hofmann: "Ber. deut. chem.," vol. 5 (1872), p. 247.

Behrend: "Liebigs Annalen," vol. 422 (1920), p. 98.

Beilstein: "Handbuch de Organische Chemie," vol. IV, 2nd sup., p. 563 (1942).